US011232332B2

(12) United States Patent
Yokote

(10) Patent No.: US 11,232,332 B2
(45) Date of Patent: Jan. 25, 2022

(54) IMAGE FORMING APPARATUS

(71) Applicant: CANON KABUSHIKI KAISHA, Tokyo (JP)

(72) Inventor: Akihito Yokote, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/952,261

(22) Filed: Nov. 19, 2020

(65) Prior Publication Data

US 2021/0150290 A1    May 20, 2021

(30) Foreign Application Priority Data

Nov. 20, 2019    (JP) .............................. JP2019-209887

(51) Int. Cl.
| | |
|---|---|
| *G06K 15/02* | (2006.01) |
| *G06K 15/12* | (2006.01) |
| *G06K 15/16* | (2006.01) |

(52) U.S. Cl.
CPC ......... *G06K 15/027* (2013.01); *G06K 15/129* (2013.01); *G06K 15/16* (2013.01); *G06K 15/1878* (2013.01)

(58) Field of Classification Search
CPC .... G06K 15/027; G06K 15/129; G06K 15/16; G06K 15/1878
See application file for complete search history.

(56) References Cited

U.S. PATENT DOCUMENTS

| | | | | |
|---|---|---|---|---|
| 2013/0242318 | A1* | 9/2013 | Yamaguchi | ........ G03G 15/5058 358/1.9 |
| 2015/0242714 | A1* | 8/2015 | Oka | ....................... B41J 29/393 358/1.5 |

FOREIGN PATENT DOCUMENTS

JP    2014-107648 A    6/2014

OTHER PUBLICATIONS

U.S. Appl. No. 16/988,194, Akihito Yokote, filed Aug. 7, 2020.

\* cited by examiner

*Primary Examiner* — Quang N Vo
(74) *Attorney, Agent, or Firm* — Venable LLP

(57) ABSTRACT

An image forming apparatus includes an image forming unit configured to form an image on a sheet, a conveyance roller configured to convey the sheet along a conveyance path, a reading unit which is provided on the conveyance path and is configured to read a pattern formed on the sheet, and a controller. The controller is configured to control the image forming unit to form a first pattern, control the conveyance roller to convey a sheet having the first pattern formed thereon, control the reading unit to read the first pattern, generate first data based on a result of reading the first pattern, and control the image forming unit to form a user image and a second pattern, the second pattern being formed in a region on the sheet that is different from a region in which the user image is formed.

7 Claims, 10 Drawing Sheets

SHEET PASSING DIRECTION

| AVERAGE BRIGHTNESS VALUE | NUMBER OF READINGS | PATCH IMAGE SIZE 8mm × 12mm | PATCH IMAGE SIZE 8mm × 40mm |
|---|---|---|---|
| 112 | 1 | 115 | 115 |
| | 2 | 150 | 150 |
| | 3 | | 111 |
| | 4 | | 114 |
| | 5 | | 90 |
| | 6 | | 110 |
| | 7 | | 112 |
| | 8 | | 110 |
| | 9 | | 115 |
| AVERAGE VALUE | | 132.5 | 114.1 |
| ERROR | | 20.5 | 2.1 |
| AVERAGE EXCLUDING TWO PIECES OF DATA OF UPPER AND LOWER LIMITS | | N/A | 112.4 |
| ERROR | | — | 0.4 |

IMAGE FORMING APPARATUS

BACKGROUND OF THE INVENTION

Field of the Invention

The present disclosure relates to an image forming apparatus, for example, a copying machine, a multifunction peripheral, or a printer.

Description of the Related Art

In recent years, the market for on-demand image forming apparatus is expanding. For example, in an offset printing market, electrophotographic image forming apparatus are becoming widespread. Image forming apparatus employing an inkjet system have succeeded in cultivating a wide market for reasons such as a large format, a low initial cost, and an extremely high speed. However, expansion of the market is not easy, and an image forming apparatus to newly enter the market must maintain image quality (hereinafter referred to as "quality") of preceding image forming apparatus that have served the market.

The quality includes a tone characteristic, granularity, in-plane evenness, letter quality, and color reproducibility (including color stability), for example. It is said that the most important of those is the color reproducibility. A human has memories of empirically expected colors (in particular, human skin, sky, and metal, for example), and feels uncomfortable about colors that deviate this allowed range of memory. Such colors of memory are called "memory colors". Reproducibility of the memory colors is important in a case where a picture or the like is printed. In addition, a group of office users who feel uncomfortable about a difference in color between a printed business document and a monitor, and a group of graphic arts users who deal with computer graphics have high demand for color reproducibility including stability of the on-demand image forming apparatus.

An electrophotographic image forming apparatus is generally configured to correct a tone characteristic so that a tone characteristic of an image to be formed matches a target tone characteristic. For the correction of the tone characteristic, a tone correction table, in which a corrected tone value is set for each tone value is stored, is used. A tone characteristic of an image is varied by a change in installation environment of the image forming apparatus and a change with time of a component. Therefore, the image forming apparatus is configured to periodically adjust (calibrate) the tone characteristic to optimize the tone correction table. The calibration is performed through formation of a tone adjustment image on a sheet. The tone adjustment image formed on the sheet is read by a reading apparatus, for example, a scanner. Based on an error between a tone characteristic obtained from the read tone adjustment image and the target tone characteristic, the tone correction table is updated.

The tone adjustment image is formed on a sheet, for example, in a non-image region excluding an image region, in which an image corresponding to a print job is formed (Japanese Patent Application Laid-open No. 2014-107648). With this configuration, it is not required any more to form the tone adjustment image on a sheet that is different from the one on which an image desired by a user is formed, and it is not required to stop print jobs. As a result, a waste sheet can be prevented from being generated.

The target tone characteristic (hereinafter referred to as "target tone") may be determined based on a result of reading the tone adjustment image formed on the first sheet of a job. The result of reading the tone adjustment image in determining the target tone may be varied due to a variation caused by repeated reading processing by the reading apparatus, surface properties (unevenness on the surface) of the sheet, and other causes. In this case, there is a fear that a correct target tone may not be determined. As a result, a result of monitoring and adjusting the tone characteristic cannot be obtained correctly, and images of appropriate colors may not be output consecutively. In view of the above-mentioned problems, the present disclosure provides an image forming apparatus capable of determining a target tone with high accuracy.

SUMMARY OF THE INVENTION

An image forming apparatus according to the present disclosure includes: an image forming unit configured to form an image on a sheet; a conveyance roller configured to convey the sheet along a conveyance path; a reading unit which is provided on the conveyance path, and is configured to read a pattern formed on the sheet; and a controller configured to: control the image forming unit to form a first pattern; control the conveyance roller to convey a sheet having the first pattern formed thereon; control the reading unit to read the first pattern; generate first data based on a result of reading the first pattern; control the image forming unit to form a user image and a second pattern, the second pattern being formed in a region on the sheet that is different from a region in which the user image is formed; control the conveyance roller to convey the sheet having the second pattern formed thereon; control the reading unit to read the second pattern; generate second data based on a result of reading the second pattern; and control, based on the first data and the second data, a density of a user image to be formed by the image forming unit, wherein the controller is configured to generate the first data based on results of reading different positions of the first pattern, wherein the controller is configured to generate the second data based on results of reading different positions of the second pattern, and wherein the number of results of reading different positions of the first pattern, which are used to generate the first data, is larger than the number of results of reading different positions of the second pattern, which are used to generate the second data.

Further features of the present invention will become apparent from the following description of exemplary embodiments (with reference to the attached drawings).

DESCRIPTION OF THE EMBODIMENTS

A description is given of at least one embodiment of the present disclosure with reference to the drawings. Various limitations that are technically preferred for embodying the present disclosure are placed on the embodiment to be described below, but are not intended to limit the scope of the disclosure to the following embodiment and illustrated examples.

Image Forming System

Figure 1:
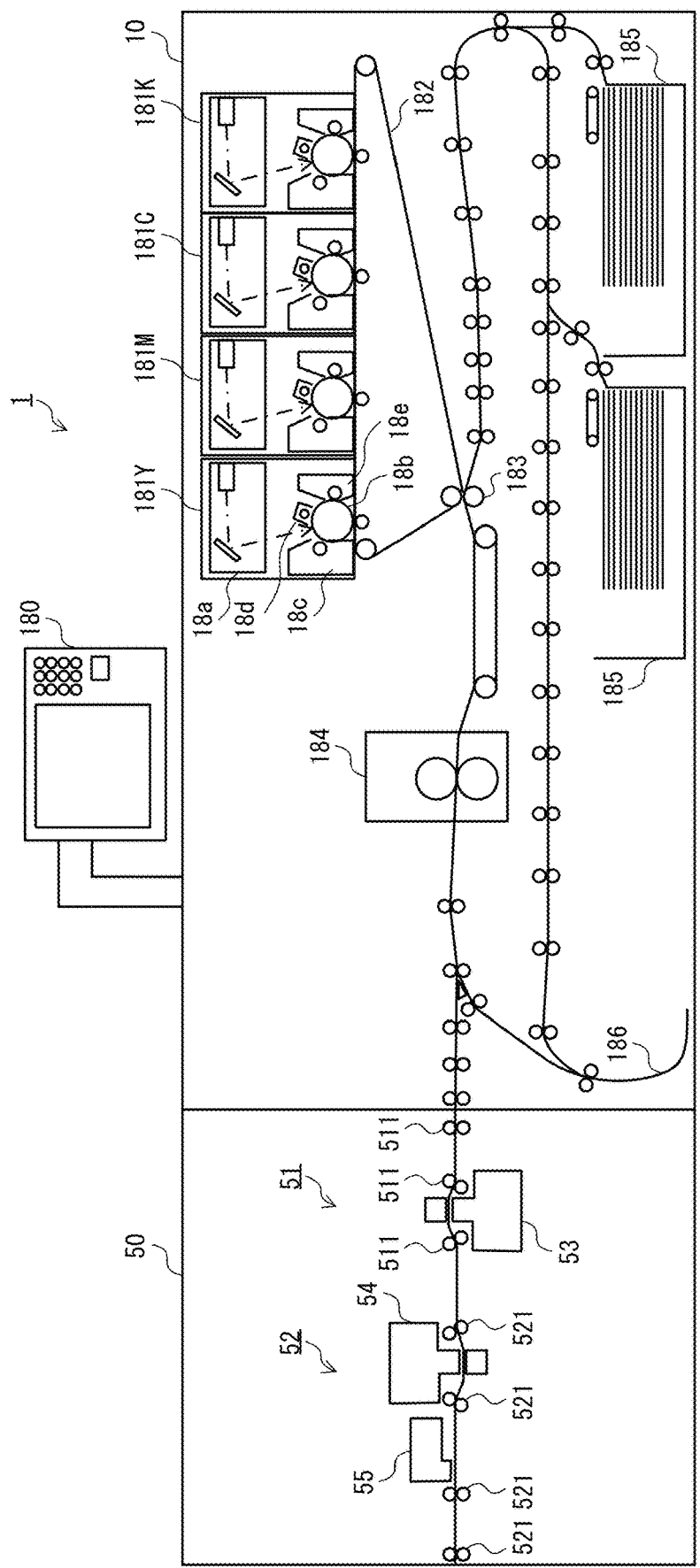
FIG. 1 is a configuration diagram of an image forming system including an image forming apparatus according to at least one embodiment of the present disclosure.

FIG. 1 is a configuration diagram of an image forming system including an image forming apparatus according to at least one embodiment of the present disclosure. An image forming system 1 includes an image forming apparatus 10, a reading apparatus 50, and an operating portion 180. The image forming apparatus 10 is configured to form an image on a sheet. The reading apparatus 50 is configured to read tone adjustment images which are test images for tone adjustment formed on the sheet. The operating portion 180 is a user interface including an input device and an output device. The input device includes various key buttons and a touch panel. The output device includes a display and a speaker.

The image forming apparatus 10 includes four image forming units 181Y, 181M, 181C, and 181K, an intermediate transfer belt 182, secondary transfer rollers 183, a fixing device 184, two sheet feeding trays 185, and an inverting mechanism 186. The image forming units 181Y, 181M, 181C, and 181K are arranged along a belt surface of the intermediate transfer belt 182. The intermediate transfer belt 182 is an endless transfer member, which is wound around a plurality of rollers to rotate in a predetermined direction (in this embodiment, clockwise direction of FIG. 1). The secondary transfer rollers 183 and the fixing device 184 are arranged on a conveyance path of a sheet, which is conveyed from one of the sheet feeding trays 185. In each of the sheet feeding trays 185, sheets of a predetermined size are contained. In this embodiment, two sheet feeding trays 185 are provided, and sheets contained in the sheet feeding trays 185 may be of the same type or different types.

The image forming units 181Y, 181M, 181C, and 181K have the same configuration, and are different only in color of an image to be formed. The image forming unit 181Y is configured to form a yellow (Y) image. The image forming unit 181M is configured to form a magenta (M) image. The image forming unit 181C is configured to form a cyan (C) image. The image forming unit 181K is configured to form a black (K) image. Here, the configuration of the image forming unit 181Y is described, and description of the configurations of the other image forming units 181M, 181C, and 181K is omitted.

The image forming unit 181Y includes an exposure device 18a, a photosensitive member 18b, a developing device 18c, a charging device 18d, and a cleaning portion 18e. The photosensitive member 18b is a drum-shaped image bearing member having a photosensitive layer on a surface thereof. The photosensitive member 18b is configured to rotate about a drum shaft counter-clockwise in FIG. 1. The charging device 18d is configured to apply a voltage to the photosensitive layer of the rotating photosensitive member 18b to uniformly charge the surface of the photosensitive member 18b. The exposure device 18a is configured to irradiate the charged surface of the photosensitive member 18b with a laser beam corresponding to a tone value of each pixel of the yellow image. Through the irradiation with the laser beam, an electrostatic latent image is formed on the surface of the photosensitive member 18b. The exposure device 18a of each of the image forming units of the other colors is configured to radiate a laser beam corresponding to a tone value of each pixel of an image of a corresponding color. As a result, on the photosensitive member 18b of each of the image forming units of the other colors, an electrostatic latent image of the corresponding color is formed.

The developing device 18c is configured to develop the electrostatic latent image formed on the photosensitive member 18b with a coloring material, for example, yellow toner. Through the development of the electrostatic latent image, the yellow image is formed on the photosensitive member 18b. The developing device 18c of each of the image forming units of the other colors is configured to develop the electrostatic latent image with a coloring material of a corresponding color. As a result, on the photosensitive member 18b of each of the image forming units of the other colors, the image of the corresponding color is formed.

The images formed on the photosensitive members 18b of the image forming units 181Y, 181M, 181C, and 181K are transferred to the intermediate transfer belt 182 to be sequentially superimposed on each other. On the intermediate transfer belt 182 having the images of the respective colors transferred thereto, a full-color image is formed. The coloring material remaining on the photosensitive member 18b after the transfer is removed by the cleaning portion 18e.

A sheet is conveyed from the sheet feeding tray 185 to the secondary transfer rollers 183 depending on the timing at which the image formed on the intermediate transfer belt 182 is conveyed to the secondary transfer rollers 183 by the rotation of the intermediate transfer belt 182. The secondary transfer rollers 183 are configured to serve as a transfer portion, which is configured to transfer the full-color image from the intermediate transfer belt 182 to the sheet. The sheet having the image transferred thereto is conveyed to the fixing device 184. The fixing device 184 is configured to heat and pressurize the sheet having the image transferred thereto to fix the image on the sheet. In a case where an image is to be formed on one side of the sheet, this completes image forming processing. In a case where images are to be formed on both sides of the sheet, the sheet having an image formed on one side thereof is conveyed from the fixing device 184 to the inverting mechanism 186, in which the front and back sides thereof are inverted. The sheet having the front and back sides thereof inverted is conveyed again to the secondary transfer rollers 183, and an image is formed in a similar procedure.

The image forming apparatus 10 is configured to perform the image forming processing described above in accordance with a print job. The print job includes data indicating an image to be formed, and image forming conditions, for example, the type of the sheet to be used. The exposure device 18a is configured to irradiate the photosensitive member 18b with the laser beam corresponding to the print job.

As described later, the image forming apparatus 10 is configured to determine whether to form tone adjustment images so as to overlap an image region of an image to be formed on the sheet in accordance with the print job. In a case where the tone adjustment images are to be formed to overlap the image region, image data (hereinafter referred to as "test image data") of the tone adjustment images is added to image data. The image data is data containing tone values of pixels of images of the respective colors. The sheet having the tone adjustment images formed thereon is read by the reading apparatus 50. Based on results of reading the tone adjustment images, tone characteristics are monitored and adjusted.

The reading apparatus 50 includes a first conveyance portion 51, a second conveyance portion 52, a first reading sensor 53, a second reading sensor 54, and a colorimetric portion 55. The first conveyance portion 51 includes a plurality of pairs of conveyance rollers 511 configured to convey the sheet after the image formation, which is supplied from the image forming apparatus 10. The second conveyance portion 52 includes a plurality of pairs of conveyance rollers 521 configured to convey the sheet after reading. The first reading sensor 53 and the second reading sensor 54 are arranged at positions across the conveyance path along which the sheet is conveyed. Therefore, the reading apparatus 50 can read images on both sides of the sheet in one conveyance operation by the first reading sensor 53 and the second reading sensor 54.

The first reading sensor 53 is arranged in the first conveyance portion 51, and is configured to read an image formed on one side of the sheet passing through the first conveyance portion 51. The first reading sensor 53 is configured to output read signals of the colors of red (R), green (G), and blue (B) as reading results. The first reading sensor 53 is, for example, an optical sensor. As the first reading sensor 53, a line sensor, for example, a complementary metal oxide semiconductor (CMOS) line sensor or a charge coupled device (CCD) line sensor, is used. In a case where a line sensor is used as the first reading sensor 53, the entire sheet can be read for a direction orthogonal to a conveying direction of the sheet.

The second reading sensor 54 is arranged in the second conveyance portion 52, and is configured to read an image formed on the other side of the sheet passing through the second conveyance portion 52. The second reading sensor 54 has a configuration similar to that of the first reading sensor 53, and is configured to output read signals of the colors of red (R), green (G), and blue (B) as reading results.

The line sensor is configured to read an image with the direction orthogonal to the conveying direction (sheet passing direction) of the sheet being one line. Therefore, the direction orthogonal to the conveying direction of the sheet is a main scanning direction. The conveying direction of the sheet is a sub-scanning direction.

The colorimetric portion 55 is arranged on a downstream side of the second reading sensor 54 in the conveying direction of the sheet. The colorimetric portion 55 is configured to read the image on the other side of the sheet passing through the second conveyance portion 52. The colorimetric portion 55 is configured to spectrally measure colors of the tone adjustment images formed on the sheet, to thereby obtain colorimetric data. The colorimetric data is expressed by a color system, for example, XYZ.

Controller

Figure 2:
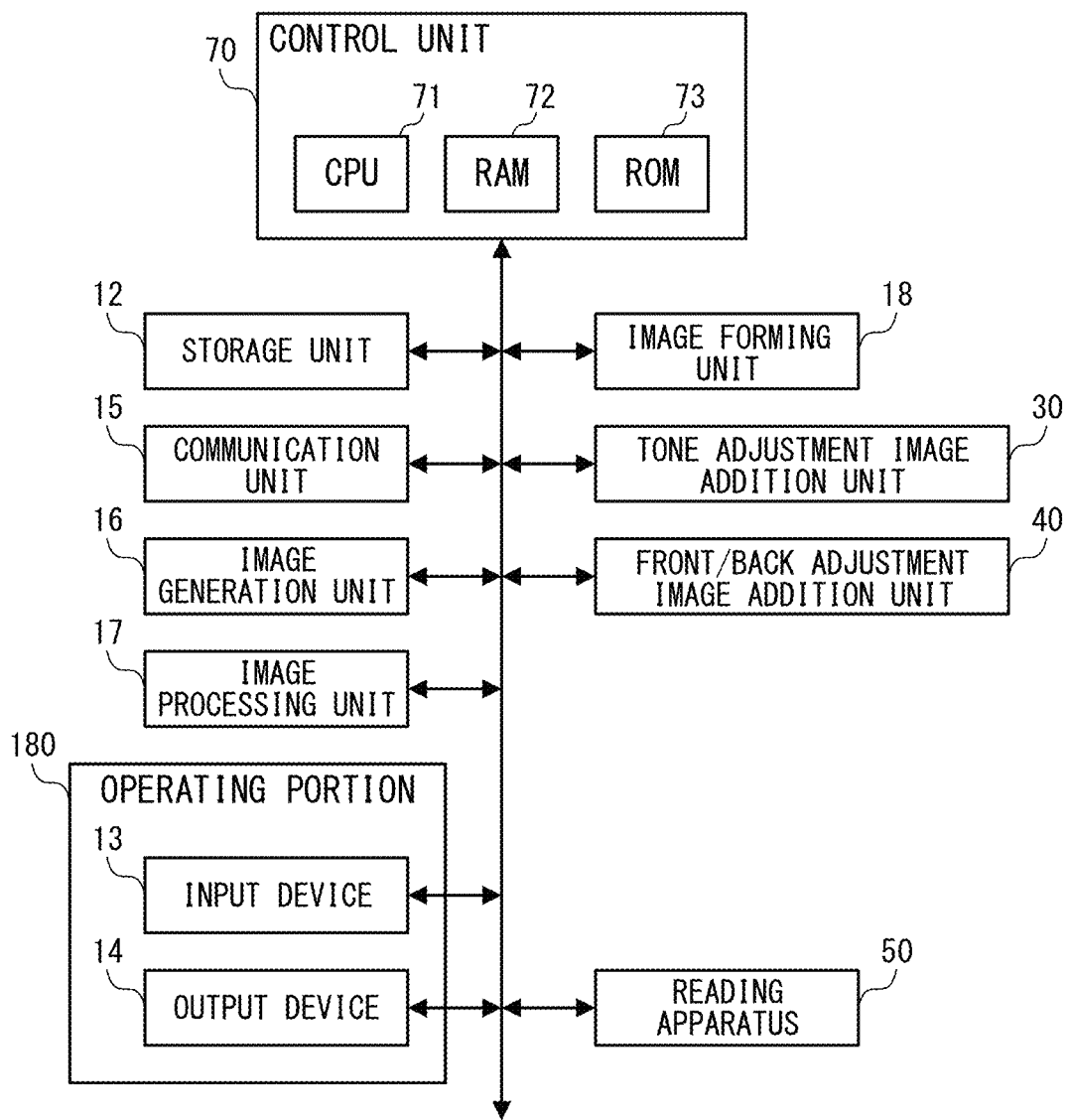
FIG. 2 is an explanatory diagram of a controller.

FIG. 2 is an explanatory diagram of a controller configured to control operation of the image forming system 1. The controller includes a control unit 70, a storage unit 12, a communication unit 15, an image generation unit 16, an image processing unit 17, an image forming unit 18, a tone adjustment image addition unit 30, and a front/back adjustment image addition unit 40. To the control unit 70, the operating portion 180 and the reading apparatus 50, which have been described above, are also connected. The operating portion 180 includes an input device 13 and an output device 14.

The control unit 70 is configured to control operation of components forming the image forming system 1. The control unit 70 includes a central processing unit (CPU) 71, a random access memory (RAM) 72, and a read only memory (ROM) 73. The CPU 71 is configured to execute a computer program stored in the ROM 73 or the storage unit 12, to thereby control the operation of the components of the image forming system 1. The RAM 72 is configured to provide a work area used in a case where the CPU 71 executes processing, and temporarily store various programs and various kinds of data, for example.

The storage unit 12 is configured to store the computer program to be executed by the control unit 70 (CPU 71), and data used in the processing, for example. The storage unit 12 is configured to store values to be used in monitoring and adjusting of the tone characteristics, which are to be described later, and in front/back adjustment. As the storage unit 12, a hard disk drive (HDD), a solid state drive (SSD), or other such mass storage devices can be used.

The communication unit 15 is a communication interface configured to control communication to/from an external device, for example, a computer provided outside the image forming system 1. For example, the communication unit 15 is configured to receive data (hereinafter referred to as "PDL data") described in a page description language (PDL) from the external device via a network. The PDL data is included in the print job for giving an instruction to form an image, for example.

The image generation unit 16 is configured to rasterize the PDL data obtained via the communication unit 15, to thereby generate image data having a bitmap format for each color of yellow, magenta, cyan, and black. The image data contains the tone value for each pixel. The tone value is a data value expressing a grayscale of an image. For example, in a case where the data value has 8 bits, the tone value can express a grayscale level of from 0 to 255.

The image processing unit 17 is configured to perform tone correction processing, halftoning, and other image processing on the image data generated by the image generation unit 16. The image processing unit 17 can also generate image data of the colors of yellow, magenta, cyan, and black by converting the colors of read signals of the colors of red (R), green (G), and blue (B), which are results of reading the image by the reading apparatus 50.

The tone correction processing is processing for converting tone values of each color included in the image data into tone values of each color that are corrected so that a color of the image when formed on the sheet matches a target color. For the tone correction processing, a tone correction table in which an output tone value corresponding to an input tone value is defined is used. Further, as described later, the image processing unit 17 performs processing of adjusting the tone characteristics with the use of the tone adjustment images when correction is enabled by the control unit 70, and performs the halftoning without performing the processing of adjusting the tone characteristics with the use of the tone adjustment images when the correction is disabled. The halftoning is screen processing using error diffusion processing or an ordered dither method, for example.

The image forming unit 18 is configured to control, under the control of the control unit 70, operation of the image forming units 181Y, 181M, 181C, and 181K, the intermediate transfer belt 182, the secondary transfer rollers 183, the fixing device 184, the sheet feeding trays 185, and the inverting mechanism 186. The image forming processing on the sheet is performed by the image forming unit 18. The image forming unit 18 is configured to form, based on tone values of each pixel of the image data that has been subjected to the image processing by the image processing unit 17, an image of a plurality of colors on the sheet. In this embodiment, the image forming unit 18 is configured to perform the image forming processing with the use of image data obtained by adding, to the image data that has been subjected to the image processing by the image processing unit 17, the test image data and image data (hereinafter referred to as "front/back adjustment image data") of front/back adjustment images. It is assumed that the image is formed to be centered on the sheet.

The tone adjustment image addition unit 30 is configured to add the test image data to the image data so that the tone adjustment images are to be formed. Further, the tone adjustment image addition unit 30 is configured to add image data (hereinafter referred to as "target tone image data") of the target tone determination images to the image data so that target tone determination images, which are to be described later, are to be formed. The target tone determination images are test images for determining target tone characteristics. In this manner, the tone adjustment image addition unit 30 is configured to add tone adjustment image data to the image data so that the tone adjustment images are to be formed. The front/back adjustment image addition unit 40 is configured to add image data of the front/back adjustment images to the image data so that the front/back adjustment images are to be formed.

Tone Adjustment Image

Figure 3:
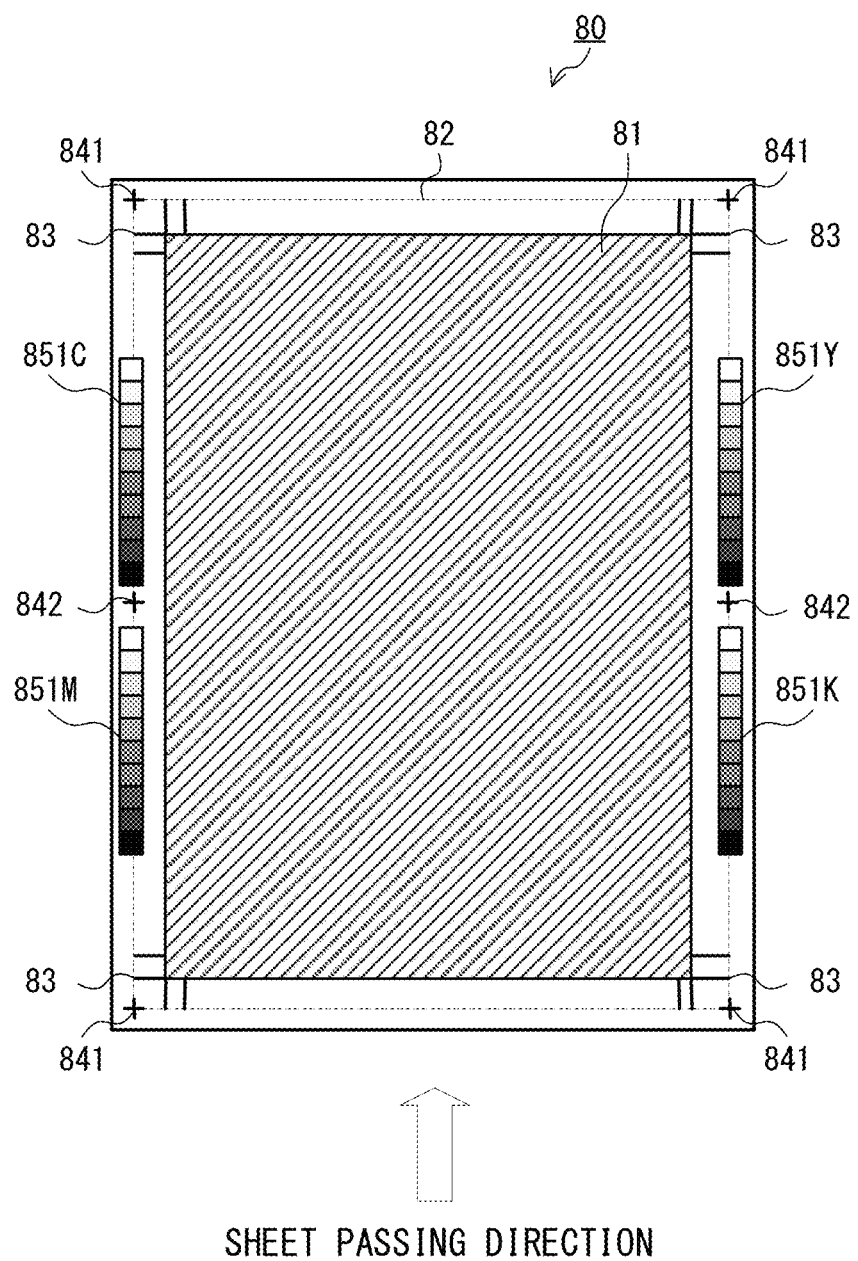
FIG. 3 is an explanatory diagram of tone adjustment images.

FIG. 3 is an explanatory diagram of the tone adjustment image to be formed on the sheet by the image forming unit 18. In FIG. 3, an image to be formed on one side of a sheet 80 is exemplified. On the sheet 80, an image region 81 is provided in the center, and a non- image region 82 is provided between the periphery of the image region 81 and edges of the sheet 80. In the image region 81, an image based on the image data that has been subjected to the image processing by the image processing unit 17 (image instructed by the print job) is formed. On the sheet 80, tone adjustment images 851Y, 851M, 851C, and 851K of the respective colors of yellow, magenta, cyan, and black, front/back adjustment images 841 and 842, and cutting marks 83 are formed. In a case where the colors are not distinguished, the tone adjustment images 851Y, 851M, 851C, and 851K are referred to as " tone adjustment images 851". The cutting marks 83 are added in advance by a user. The cutting marks 83 are each formed of two L-shaped marks overlapping each other, and are formed in the vicinity of four corners of the image region 81. A portion surrounded by the four cutting marks 83 (region enclosed by the broken line) forms a cutting position of the sheet 80. The hatching indicating the image region 81 is shown for the purpose of illustration, and is not to be actually formed on the sheet 80. Further, the sheet 80 is conveyed (passed) in a longitudinal direction thereof.

The tone adjustment images 851 may be formed in any peripheral portions of the sheet 80, but are preferably formed, as illustrated in FIG. 3, in both end portions of the sheet 80 in the direction (lateral direction of the sheet 80) orthogonal to the sheet passing direction of the sheet 80 (longitudinal direction of the sheet 80). In other words, the tone adjustment images 851 of any two of yellow, magenta, cyan, and black are formed in one end portion in the lateral direction of the sheet 80, and the tone adjustment images 851 of the remaining two colors are formed in the other end portion in the lateral direction of the sheet 80. In this embodiment, the tone adjustment image 851C and the tone adjustment image 851M are formed in one end portion in the lateral direction of the sheet 80, and the tone adjustment image 851Y and the tone adjustment image 851K are formed in the other end portion in the lateral direction of the sheet 80. The tone adjustment images 851 are not formed in a leading end portion in the sheet passing direction of the sheet 80, and hence curling of the sheet 80 during the fixing process can be prevented.

Each of the tone adjustment images 851Y, 851M, 851C, and 851K is formed of patch images of a plurality of tone levels obtained by gradually varying tone values. In FIG. 3, each of the tone adjustment images 851 is formed of patch images of 10 tone levels. Each patch image has a length in the main scanning direction of 8 mm, and a length in the sub-scanning direction of 12 mm, for example. The main scanning direction is the direction orthogonal to the sheet passing direction, and the sub-scanning direction is the sheet passing direction. The plurality of patch images are arrayed in line in the sheet passing direction of the sheet 80.

In a case where tone values are expressed in 255 tone levels, a tone value of each of the plurality of patch images arrayed in line of a tone adjustment image 851 are set to any one value of from 0 to 255 so that differences between tone values of each pair of adjacent patch images are equal to each other. Further, tone values of patch images at both ends are set to 0 and 255, respectively. The patch images forming the tone adjustment images 851 are not limited to yellow, magenta, cyan, and black, and may be formed of R, G, B, and process Bk, for example.

In this embodiment, sizes of the tone adjustment images 851 are determined in a range in which the tone adjustment images 851Y, 851M, 851C, and 851K of all four colors are fit onto one A3-size sheet fed longitudinally (297 mm in main scanning direction by 420 mm in sub-scanning direction).

The sheet 80 is read by the reading apparatus 50. Results of reading the tone adjustment images 851Y, 851M, 851C, and 851K and the front/back adjustment images 841 and 842 by the reading apparatus 50 are stored in the storage unit 12 or the RAM 72 of the control unit 70. The stored reading results are analyzed by the control unit 70.

The control unit 70 is configured to monitor and adjust tone characteristics of an image formed by the image forming unit 18. After performing initial adjustment of correction processing by the image processing unit 17, the control unit 70 causes the image forming unit 18 to form images corresponding to the print job and the tone adjustment images 851 on a predetermined number n (n is an integer of 1 or more) of sheets 80. The control unit 70 causes the reading apparatus 50 to read the tone adjustment images 851 formed on the n-th sheet 80, and calculates adjustment values of the tone characteristics based on the reading results.

The control unit 70 forms, while forming images on the (n+1)th and subsequent sheets 80 by the image forming unit 18, the tone adjustment images 851 while switching tone correction with the use of the tone correction table based on the calculated adjustment values to be enabled/disabled. The control unit 70 alternately performs the monitoring and the adjustment of the tone characteristic for each sheet 80. For the image data of the print job, the control unit 70 performs the tone correction by the image processing unit 17 while always enabling the correction with the use of the above-mentioned tone correction table.

Figure 4:
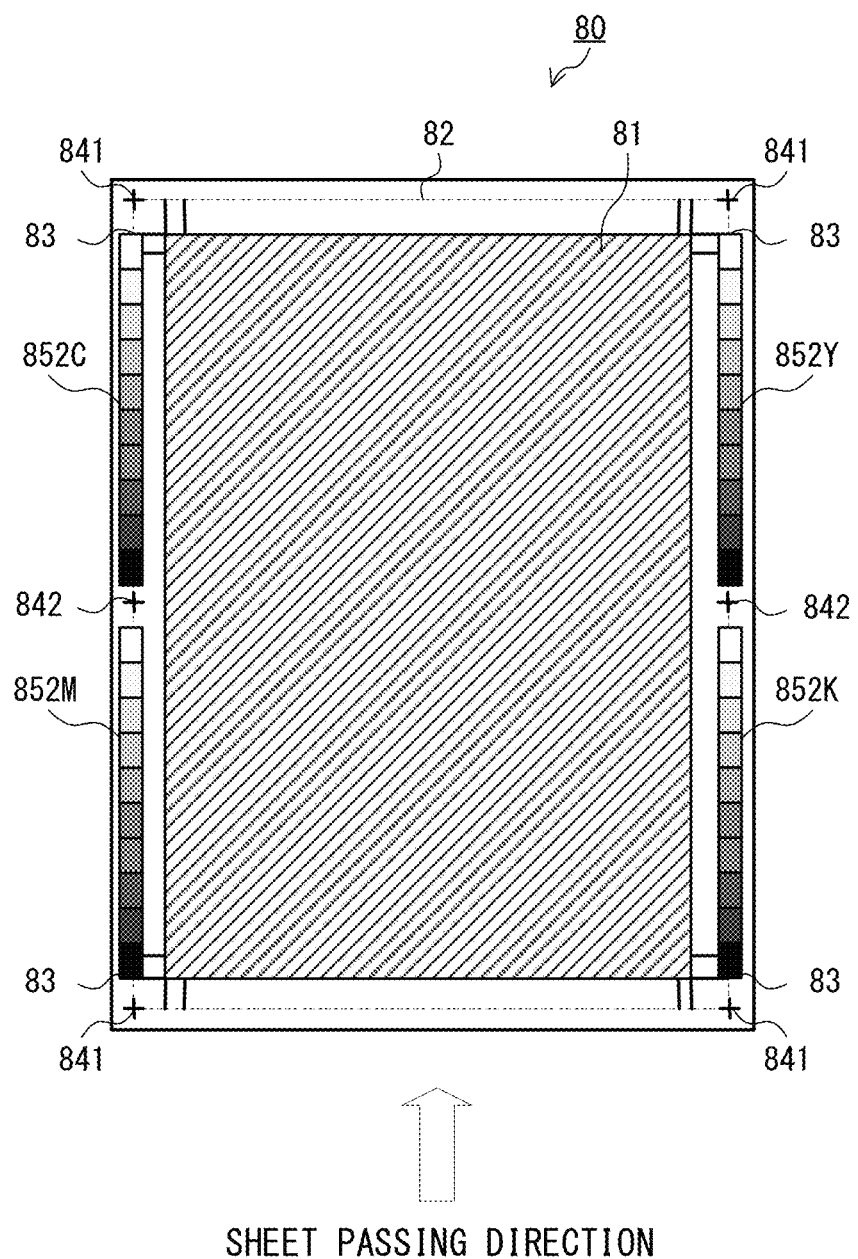
FIG. 4 is an exemplary diagram of target tone determination images.

FIG. 4 is an exemplary diagram of images (hereinafter referred to as "target tone determination images") for determining a target tone in this embodiment. As compared with the tone adjustment images 851, the target tone determination images are formed with increased sizes of patch images. On the sheet 80, target tone determination images 852Y, 852M, 852C, and 852K of the respective colors of yellow, magenta, cyan, and black are formed. In a case where the colors are not distinguished, the target tone determination images 852Y, 852M, 852C, and 852K are referred to as "target tone determination images 852". Each of the target tone determination images 852 is formed of patch images of 10 tone levels. Each patch image has a length in the main scanning direction of 8 mm, and a length in the sub-scanning direction of 20 mm, for example. The plurality of patch images are arrayed in line in the sheet passing direction of the sheet 80.

In this embodiment, a description is given of a case in which the reading apparatus 50 outputs a range of 4 mm by 4 mm as one unit of a reading result with a resolution of 600 dpi. The reading apparatus 50 does not read 2-mm widths at a leading end and a trailing end in the sub-scanning direction (sheet passing direction) of each patch image in consideration of the effects of optical flare and toner edge effects. Therefore, when each patch image of the tone adjustment images 851 has sizes of the length in the main scanning direction of 8 mm and the length in the sub-scanning direction of 12 mm (see FIG. 3), a reading result of a patch image of one tone level consists of 2 pieces of data. During the tone adjustment, an average value of the 2 pieces of data is adopted as a brightness value of the patch image. As the brightness value, a maximum value or a minimum value may be adopted instead of the average value. Which one of the average value, the maximum value, and the minimum value is to be adopted as the brightness value is determined based on a configuration of the reading apparatus 50 and features of the image forming apparatus 10.

In a case where the sizes of each patch image of the target tone determination images 852 are set to be the same as the sizes of each patch image of the tone adjustment images, the brightness value of the patch image of the target tone determination images 852 is determined based on 2 pieces of data. However, with 2 pieces of data, a reading error of the reading apparatus 50, fluttering of the sheet during the conveyance, and unevenness on the surface of the sheet affect the reading result of the patch images, which is undesirable for setting of a target tone with high accuracy. Incorrect determination of the target tone leads to overcorrection or undercorrection of tone, and emerges as reduced quality.

Therefore, the sizes of each patch image of the target tone determination images 852 in this embodiment are extended in the sub-scanning direction (sheet passing direction) more than the sizes of each patch image of the tone adjustment images. With this configuration, in a case where the reading apparatus 50 outputs a range of 4 mm by 4 mm as one unit of a reading result with a resolution of 600 dpi, a reading result of a patch image of one tone level consists of 4 pieces of data. Therefore, the above-mentioned effects on the reading result can be reduced.

Figure 5:
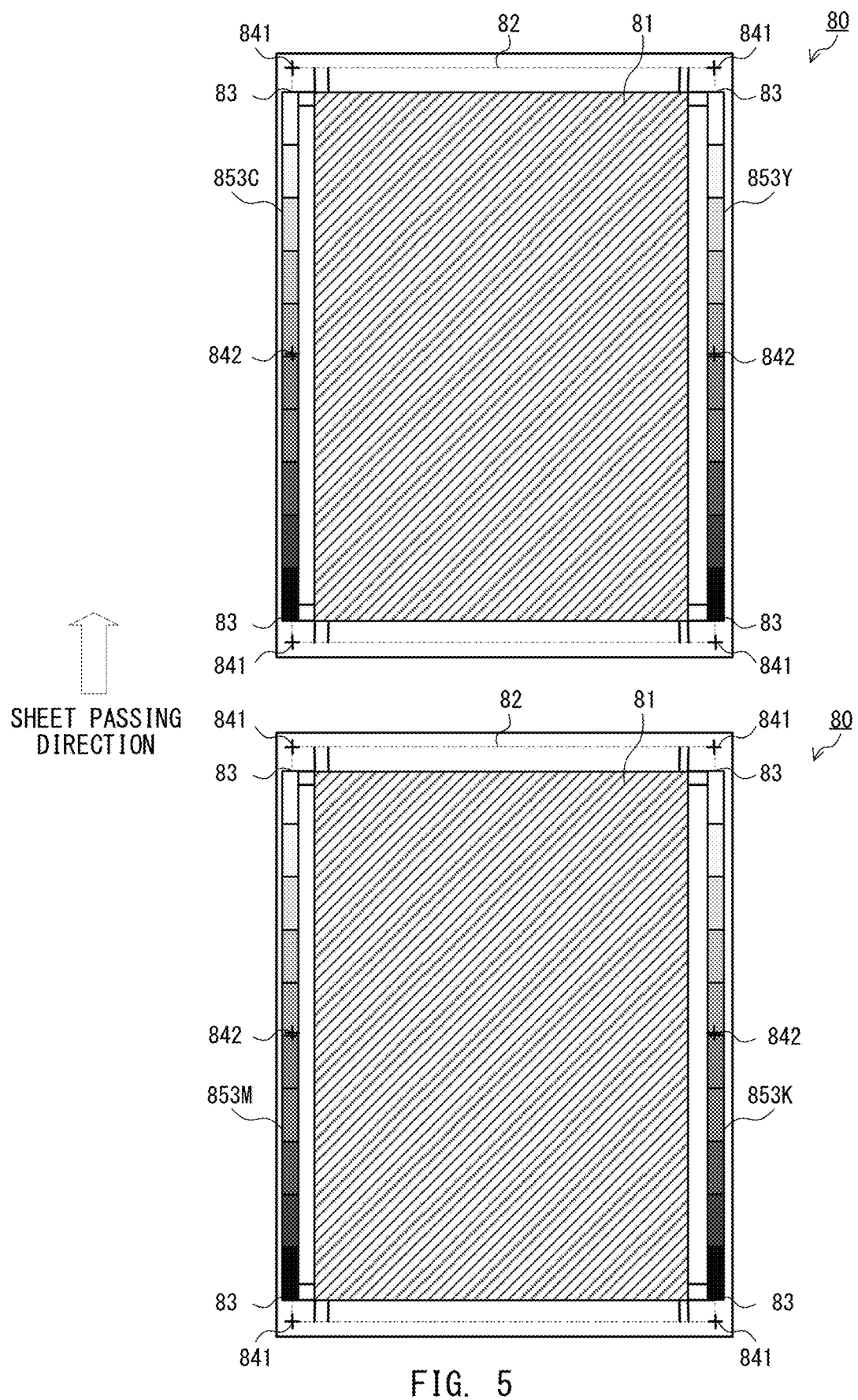
FIG. 5 is an exemplary diagram of target tone determination images.

In FIG. 4, sizes of the target tone determination images 852 are determined in a range in which the target tone determination images 852Y, 852M, 852C, and 852K of all four colors are fit onto one A3-size sheet 80 fed longitudinally. When it is required to determine the target tone with higher accuracy, the target tone determination images exemplified in FIG. 5 may be used. In the example of FIG. 5, target tone determination images of two different colors are formed on each one sheet of two sheets 80, so target tone determination images of four colors are formed with two sheets 80.

On the first sheet 80, target tone determination images 853Y and 853C of the respective colors of yellow and cyan are formed. On the second sheet 80, target tone determination images 853M and 853K of the respective colors of magenta and black are formed. In a case where the colors are not distinguished, the target tone determination images 853Y, 853M, 853C, and 853K are referred to as "target tone determination images 853". Each of the target tone determination images 853 is formed of patch images of 10 tone levels. Each patch image has a length in the main scanning direction of 8 mm, and a length in the sub-scanning direction of 40 mm, for example. The plurality of patch images are arrayed in line in the sheet passing direction of the sheet 80. In a case where the reading apparatus 50 outputs a range of 4 mm by 4 mm as one unit of a reading result with a resolution of 600 dpi for a patch image having the above-mentioned sizes, a reading result of a patch image of one tone level consists of 9 pieces of data. Therefore, the effects on the reading result can be reduced more than the case of the target tone determination images 852 of FIG. 4. The following description is given of the case of using the target tone determination images 853 of FIG. 5.

The target tone determination images 853 may be used as the tone adjustment images. However, in this case, disadvantages of an increased amount of consumed toner and generation of a time lag of the tone correction caused by image formation on a plurality of sheets 80 occur. Therefore, during normal tone correction, it is preferred to fit the patch images into minimum sizes of the patch images. Normal patch images of the tone adjustment images 851 are printed page by page, and reading results of the patch images are continuously corrected as differences from the target tone. Therefore, the effects of one reading error on actual tone are small. Therefore, the sizes of each normal patch image of the tone adjustment images 851 may be smaller than the sizes of each patch image of the target tone determination images 852 and 853.

Figure 6:
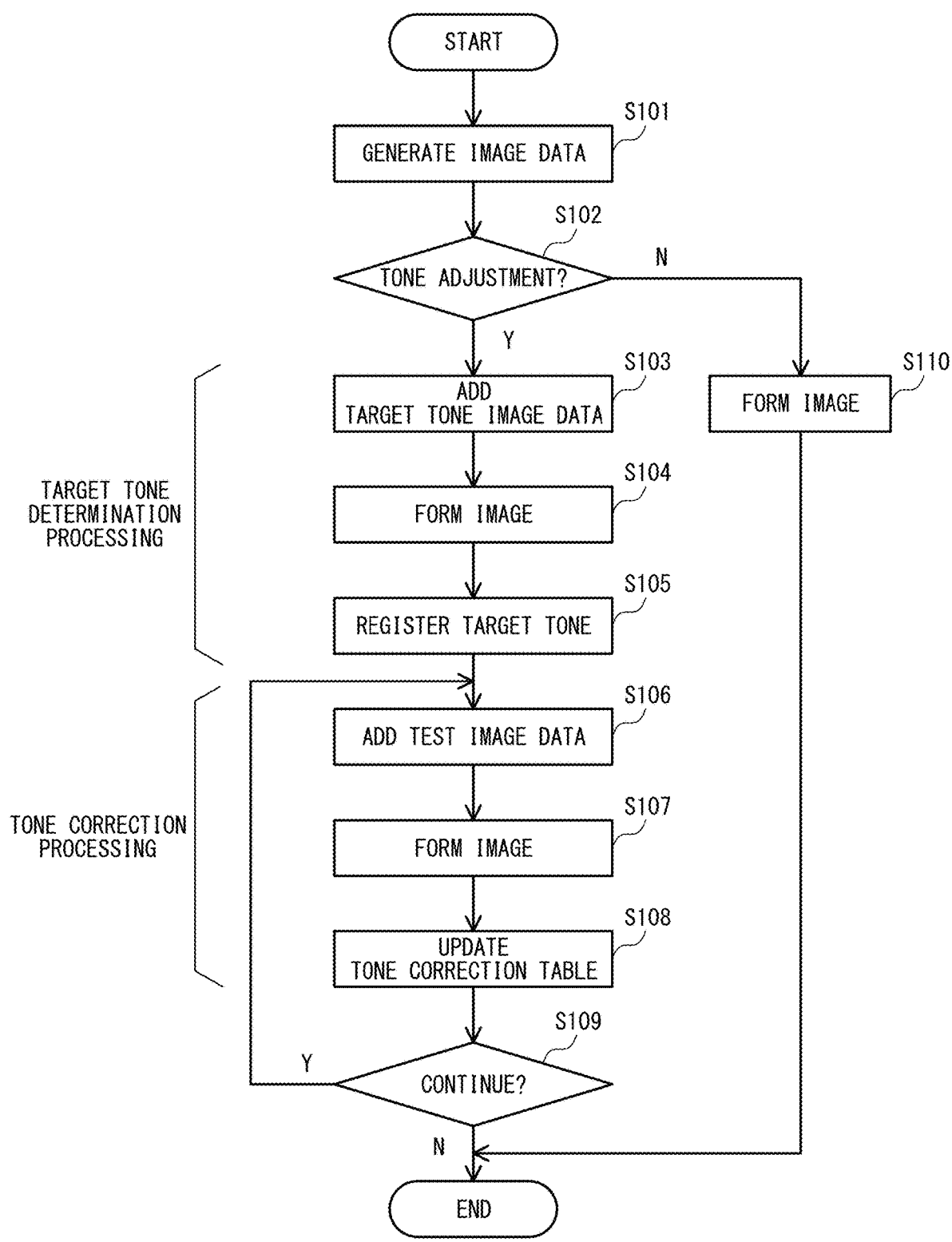
FIG. 6 is a flow chart for illustrating image forming processing.

FIG. 6 is a flow chart for illustrating the image forming processing in this embodiment. The image forming processing may be performed for each print job, or for each sheet feeding tray 185. In this processing, the target tone determination images 853 of FIG. 5 are used during target tone determination processing, and the tone adjustment images 851 of FIG. 3 are used during the tone correction processing.

The CPU 71 of the control unit 70 generates, by the image generation unit 16, image data of an image to be formed on a sheet (Step S101). The CPU 71 determines whether to perform the tone adjustment (Step S102). Whether to perform the tone adjustment is set in advance by the user with the use of the input device 13. Details of the settings are stored in the RAM 72, and the CPU 71 makes the determination by referring to the RAM 72.

In a case where the tone adjustment is to be performed (Step S102: Y), the CPU 71 performs the target tone determination processing. When starting the target tone determination processing, the CPU 71 first adds, by the tone adjustment image addition unit 30, to image data for the first sheet generated by the image generation unit 16, the target tone image data for determining the target tone of the print job (Step S103). The CPU 71 performs, by the image forming unit 18, the image forming processing on the sheet based on the image data having the target tone image data added thereto (Step S104). As a result, as exemplified in FIG. 5, a print obtained by forming, on the sheet 80, the target tone determination images 853 and the image instructed by the print job is generated. The image instructed by the print job is formed in the image region 81. The print is conveyed to and read by the reading apparatus 50. The CPU 71 obtains a brightness value from a result of reading the target tone determination images 853 by the reading apparatus 50. The CPU 71 determines the obtained brightness value as the target tone, and registers the target tone in the RAM 72 (Step S105).

The result of reading the target tone determination images 853 consists of 9 pieces of data for each patch image, that is, for each tone level of one color. The CPU 71 sets an average value of 7 pieces of data excluding the upper and lower limit values from the 9 pieces of data as a brightness value of the patch image. As a result, the brightness value of the patch image can be determined correctly, and the target tone is determined with high accuracy. The target tone determination images 853 are formed on two sheets, and hence the processing of Steps S103 to S105 is repeated twice. To image data for the first sheet, the target tone image data of the target tone determination images 853Y and 853C of yellow and cyan are added, and to image data for the second sheet, the target tone image data of the target tone determination images 853M and 853K of magenta and black are added. In this manner, the target tone determination processing is performed.

In a case where the target tone determination processing ends, the CPU 71 starts normal tone correction processing. When starting the normal tone correction processing, the CPU 71 first adds, to image data generated by the image generation unit 16, the test image data by the tone adjustment image addition unit 30 (Step S106). The CPU 71 performs, by the image forming unit 18, the image forming processing on a sheet based on the image data having the test image data added thereto (Step S107). As a result, as exemplified in FIG. 3, a print obtained by forming, on the sheet 80, the tone adjustment images 851 and the image instructed by the print job is generated. The image instructed by the print job is formed in the image region 81. The print is conveyed to and read by the reading apparatus 50. The CPU 71 obtains a brightness value from a result of reading the tone adjustment images 851 by the reading apparatus 50. The CPU 71 updates the tone correction table based on a difference between the obtained brightness value and the target tone (Step S108).

The CPU 71 repeatedly performs the tone correction processing while the print job continues (Step S109: Y). In a case where the print job is finished (Step S109: N), the CPU 71 ends the image forming processing. In a case where the tone adjustment is not to be performed (Step S102: N), the CPU 71 performs, by the image forming unit 18, the image forming processing on the sheet based on the image data generated by the image generation unit 16 (Step S110), and ends the image forming processing.

As described above, in the case of a job in which the tone adjustment images are formed on the sheet to perform the tone correction, the number of pieces of data of the result of reading the patch images of the target tone determination images in determining the target tone is larger than the number of pieces of data of the result of reading the patch images of the tone adjustment images. As a result, the effects of a measurement error of the reading apparatus 50, unevenness on the surface of the sheet, and fluttering of the sheet caused by the conveyance on the reading result are reduced, and the target tone can be set correctly.

Figures 7A, 7B:
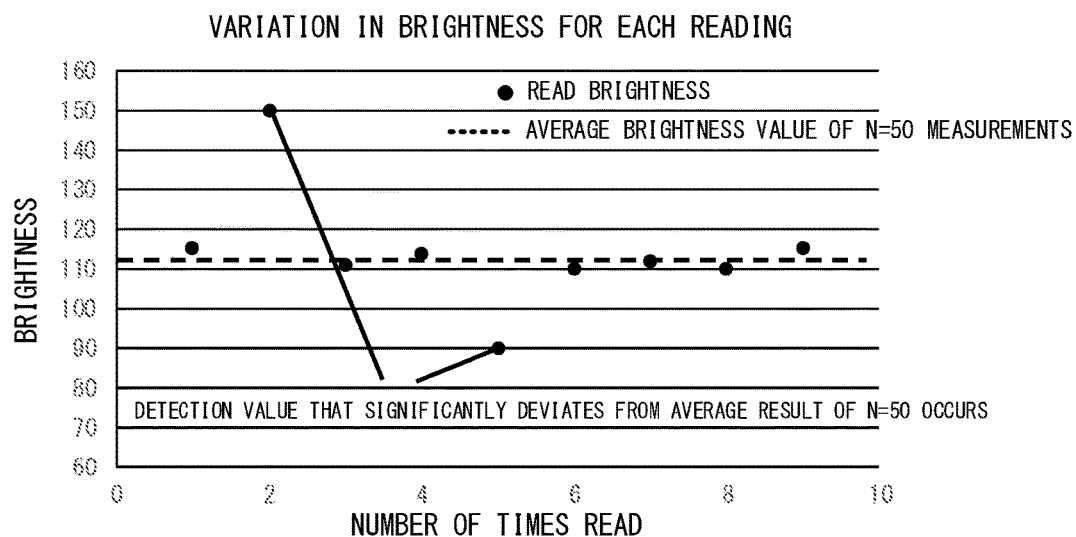
FIG. 7A and FIG. 7B are explanatory diagrams for showing effects of the number of pieces of data of a reading result.

FIG. 7A and FIG. 7B are explanatory diagrams of effects of the number of pieces of data of the reading result. FIG. 7A exemplifies brightness values for cases in which the number of times of (number of pieces of data obtained by) reading one patch image for determining the target tone is 2 and 9. In a case where the number of pieces of data is 2, the sizes of the read patch image are sizes (8 mm by 12 mm) of each patch image of the tone adjustment images 851. In a case where the number of pieces of data is 9, the sizes of the read patch image are sizes (8 mm by 40 mm) of each patch image of the target tone determination images 853.

It is assumed that an average value of brightness values of actual patch images is "112". In a case where the number of pieces of data is 9, an average value of 7 pieces of data excluding the upper and lower limit values from 9 pieces of data is used as the read brightness value. As shown in FIG. 7A, as compared to the average value of the brightness values calculated from the 2 pieces of data, the average value of the brightness values calculated from the 7 pieces of data excluding the upper and lower limit values from the 9 pieces of data is closer to the average value of the brightness values of the actual patch images. In this manner, the brightness value obtained from the result of reading the patch images of the target tone determination images 853 can suppress the effect of a disturbance on the reading result.

FIG. 7B shows an average value of results obtained by reading one patch image 50 times for determining the target tone as the broken line. In a case where the patch image is read 50 times, a brightness value having substantially the same value as the brightness value of the actual patch image is detected. However, in order to read one patch image 50 times by the reading apparatus 50, the patch image has the following sizes: the length in the main scanning direction of 8 mm by the length in the sub-scanning direction of 204 mm. Those sizes are impractical. Therefore, as shown in FIG. 7B, in order to obtain substantially the same brightness value as that obtained by reading the patch image 50 times, the sizes of each patch image of the target tone determination images 853 in this embodiment are set as follows: the length in the main scanning direction of 8 mm by the length in the sub-scanning direction of 40 mm.

As described above, in this embodiment, the target tone is determined correctly, and the difference between the brightness value detected from the subsequent tone adjustment images and the target tone is corrected. The target tone is determined correctly because the number of results of reading the patch image of the same color obtained with the use of the target tone determination images is larger than the number of results of reading the patch image obtained with the use of the tone adjustment images 851. As a result, the image forming apparatus 10 can prevent overcorrection or undercorrection of tone, and can form images having appropriate quality for a long period of time. As described above, according to the present disclosure, the target tone can be determined with high accuracy, and images of appropriate colors can be output consecutively.

Modification Examples

The target tone determination images 852 and 853 of FIG. 4 and FIG. 5 are formed so that the sizes of each patch image are larger than the sizes of each patch image of the tone adjustment images 851. It is only required that the patch image of each tone level of the target tone determination images be larger in number of reading results (number of pieces of data) than the patch image of each tone level of the tone adjustment images 851. The number of reading results can be increased not only by increasing the sizes of the patch image, but also by increasing the number of patch images having the same tone value. Therefore, in FIG. 8 and FIG. 9, target tone determination images obtained by increasing the number of patch images as compared to the tone adjustment images 851 are described.

Figure 8:
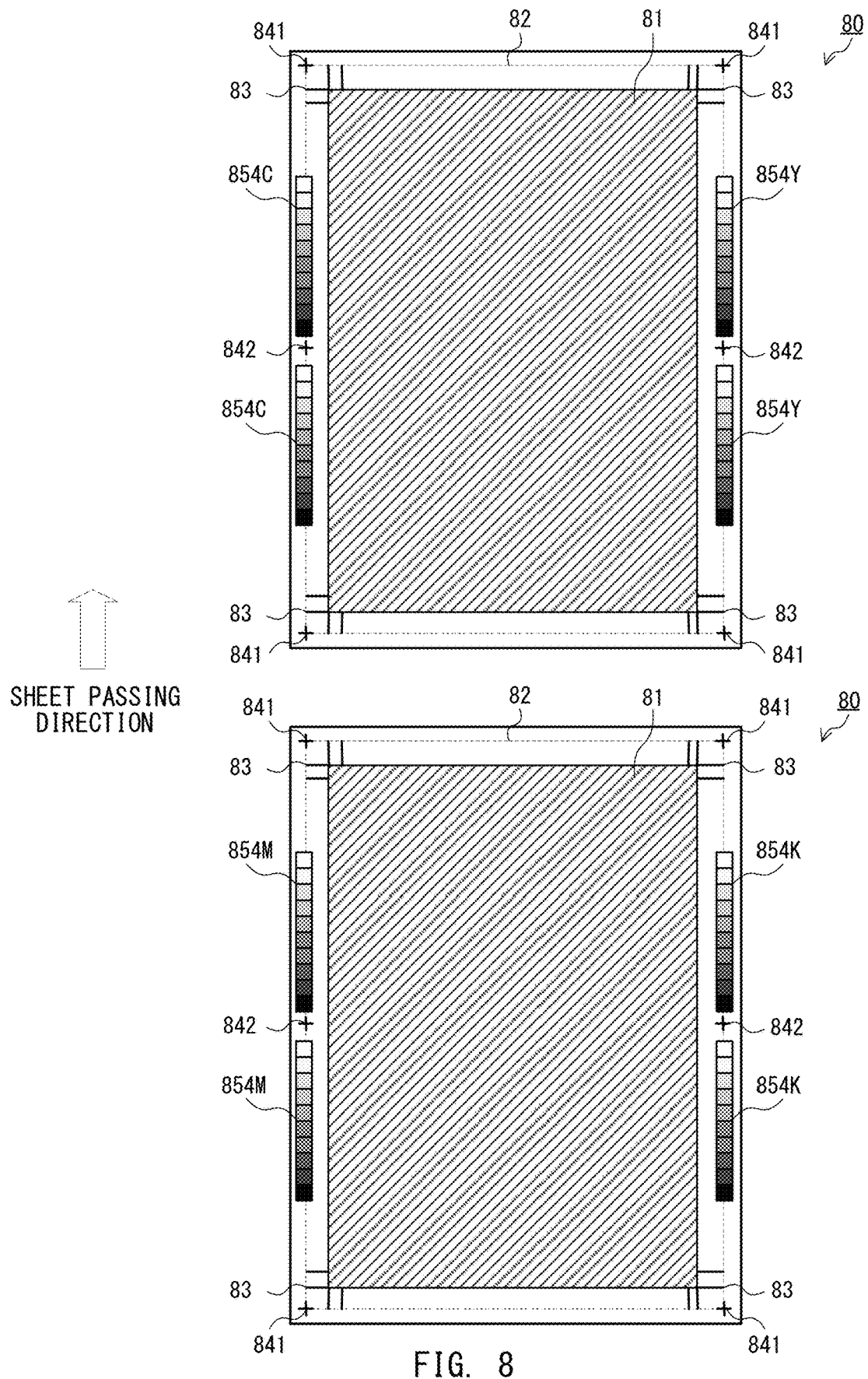
FIG. 8 is an exemplary diagram of target tone determination images.

FIG. 8 is an exemplary diagram of the target tone determination images. In the example of FIG. 8, target tone determination images of two colors are formed on each one sheet of two sheets 80, so target tone determination images of four colors are formed with two sheets 80. On the first sheet 80, target tone determination images 854Y and 854C of the respective colors of yellow and cyan are formed. On the second sheet 80, target tone determination images 854M and 854K of the respective colors of magenta and black are formed. In a case where the colors are not distinguished, the target tone determination images 854Y, 854M, 854C, and 854K are referred to as "target tone determination images 854". Each of the target tone determination images 854 is formed of patch images of 10 tone levels. Each patch image has a length in the main scanning direction of 8 mm, and a length in the sub-scanning direction of 12 mm, for example. The plurality of patch images are arrayed in line in the sheet passing direction of the sheet 80.

The patch images of the target tone determination images 854 have the same sizes and shapes as the patch images of the tone adjustment images 851 as opposed to the target tone determination images 852 and 853. It should be noted, however, that the target tone determination images 854 of the same color are formed in two places on the same sheet 80. For example, the target tone determination images 854Y are formed in two places in the sheet passing direction on the right side of the sheet 80. Also, with the target tone determination images 854, a larger number of pieces of data read from the patch images of the same tone level than those read from the patch image of the tone adjustment image 851 can be secured, and hence effects similar to those obtained by the target tone determination images 852 and 853 can be obtained.

Figure 9:
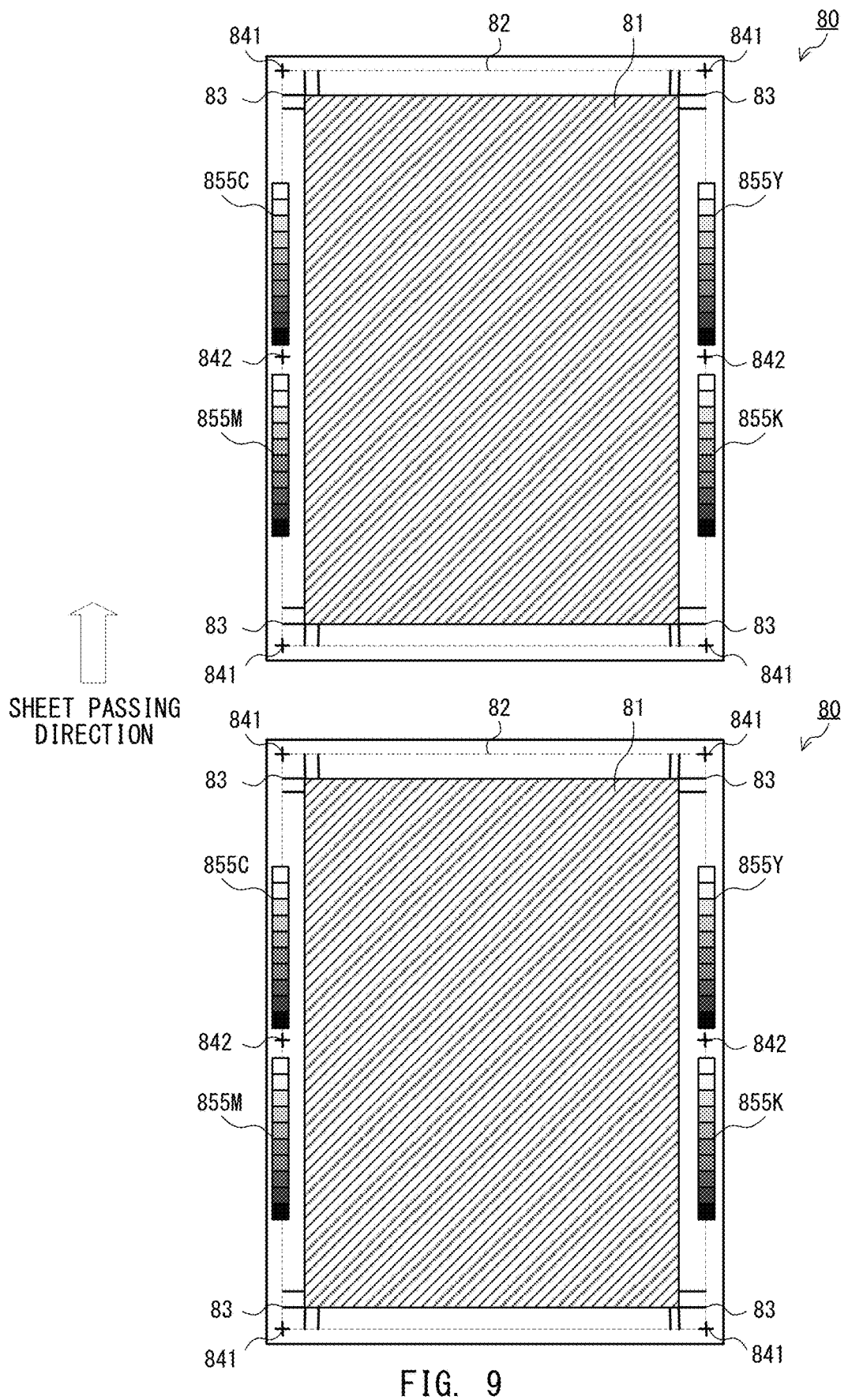
FIG. 9 is an exemplary diagram of target tone determination images.

FIG. 9 is an exemplary diagram of the target tone determination images. In the example of FIG. 9, target tone determination images of four colors are formed on two sheets 80. On the first and second sheets 80, images similar to the tone adjustment images 851 of FIG. 3 are formed. In other words, on each of the first and second sheets 80, target tone determination images 855Y, 855M, 855C, and 855K of the respective colors of yellow, magenta, cyan, and black are formed. In a case where the colors are not distinguished, the target tone determination images 855Y, 855M, 855C, and 855K are referred to as "target tone determination images 855". Each of the target tone determination images 855 is formed of patch images of 10 tone levels. Each patch image has a length in the main scanning direction of 8 mm, and a length in the sub-scanning direction of 12 mm, for example. The plurality of patch images are arrayed in line in the sheet passing direction of the sheet 80.

In other words, the two sheets 80 each having the tone adjustment images 851 of FIG. 3 formed thereon are used to form the target tone determination images 855 in this embodiment. Results of reading the target tone determination images 855 by the reading apparatus 50 can reduce a reading error through averaging or exclusion of outliers. Also, with the target tone determination images 855, a larger number of pieces of data read from the patch images of the same tone level than those read from the patch image of the tone adjustment images 851 can be secured, and hence effects similar to those obtained by the target tone determination images 852 and 853 can be obtained.

As described above, the number of patch images used in the calculation for determining the target tone, and the number of sheets on which the patch images are printed can be changed as appropriate. In a case where the number of pieces of data to be averaged is increased, the target tone can be set more correctly. However, in a case where the number is increased too much, the timing to start the tone correction is delayed. Therefore, it is required that appropriate numbers be set or announced in advance.

Figure 10:
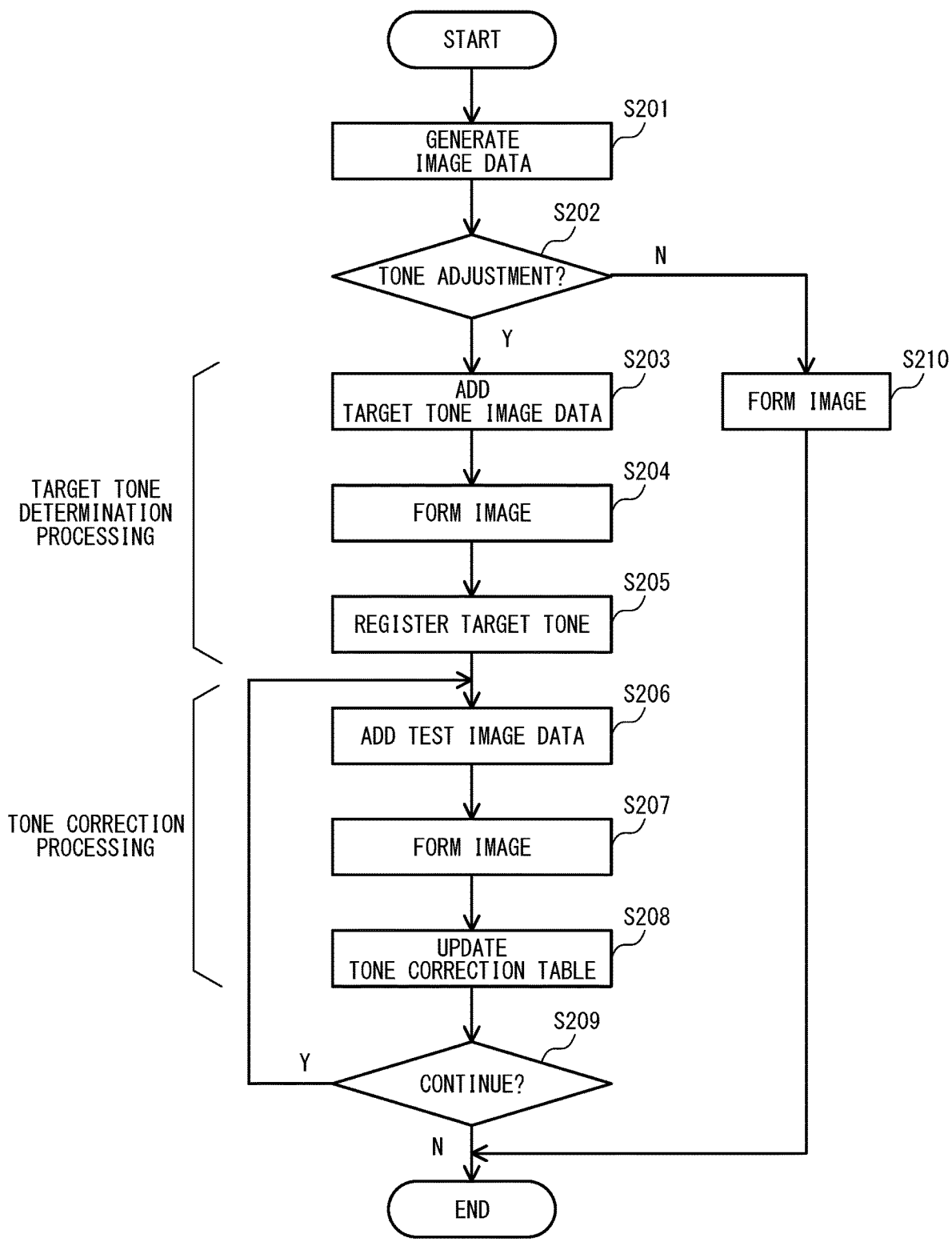
FIG. 10 is a flow chart for illustrating image forming processing.

FIG. 10 is a flow chart for illustrating image forming processing. The image forming processing may be performed for each print job, or for each sheet feeding tray 185. In this processing, the target tone determination images 854 or the target tone determination images 855 of FIG. 8 or FIG. 9 are used during the target tone determination processing, and the tone adjustment images 851 of FIG. 3 are used during the tone correction processing.

The CPU 71 of the control unit 70 generates image data as in the processing of Steps S101 and S102 of FIG. 6, and determines whether to perform the tone adjustment (Steps S201 and S202). In a case where the tone adjustment is not to be performed (Step S202: N), the CPU 71 performs the image forming processing on the sheet as in the processing of Step S110 of FIG. 6 (Step S210), and ends the image forming processing.

In a case where the tone adjustment is to be performed (Step S202: Y), the CPU 71 performs target tone determination processing. When starting the target tone determination processing, the CPU 71 first adds, by the tone adjustment image addition unit 30, to each piece of image data for the first sheet and the second sheet generated by the image generation unit 16, the target tone image data for determining the target tone of the print job (Step S203). The CPU 71 sequentially performs, by the image forming unit 18, the image forming processing on the two sheets based on the image data having the target tone image data added thereto (Step S204). As a result, as exemplified in FIG. 8 or FIG. 9, a print obtained by forming, on the sheets 80, the target tone determination images and the image instructed by the print job in the image region 81 is generated. The print is conveyed to and read by the reading apparatus 50. The CPU 71 obtains a brightness value from a result of reading the target tone determination images 853 by the reading apparatus 50. The CPU 71 determines the obtained brightness value as the target tone, and registers the target tone in the RAM 72 (Step S205). With the processing of averaging or removing outliers being performed on the result of reading the plurality of patch images of the same color, accuracy of the target tone is increased. The target tone determination processing is thus performed.

In a case where the target tone determination processing ends, the CPU 71 performs the normal tone correction processing as in the processing of Steps S106 to S109 of FIG. 6 (Steps S206 to S209). In a case where the print job is finished (Step S209: N), the CPU 71 ends the image forming processing.

The target tone determination images 854 and 855 of FIG. 8 and FIG. 9 are formed on a plurality of sheets. With the use of the target tone determination images 854 and 855, the effects of a measurement error of the reading apparatus 50, unevenness on the surface of the sheet, and fluttering of the sheet during the conveyance on the reading result are reduced, and the target tone can be set correctly.

The image forming apparatus 10 determines the target tone correctly, and corrects a difference between the brightness value detected from the subsequent tone adjustment images and the target tone. The target tone is determined correctly because the number of results of reading the patch images of the same color by the target tone determination images is larger than the number of results of reading the patch images by the tone adjustment images 851. With this configuration, the image forming apparatus 10 can prevent overcorrection and undercorrection of the tone, and can form images having appropriate quality for a long period of time. As described above, according to the present disclosure, the target tone can be determined with high accuracy, and images of appropriate colors can be output consecutively.

The embodiment and Modification Examples described above are mere examples of the present disclosure, and the present disclosure is not limited thereto. Modifications can be made thereto without departing from the spirit of the present disclosure. For example, the reading apparatus 50 may be provided inside the image forming apparatus 10, rather than outside the image forming apparatus 10.

The image forming system 1 may include a sheet processing device, which is configured to perform stapling, punching, folding, bookbinding, and other sheet processing, on a downstream side in a sheet conveying direction of the reading apparatus 50. The sheet processing device may execute the sheet processing only when instructed by the control unit 70. When no instruction is given by the control unit 70, and the sheet processing is not to be performed, the sheet processing device delivers the conveyed sheet directly.

Further, the first reading sensor 53 reads the image of the sheet from below, and the second reading sensor 54 and the colorimetric portion 55 read the image of the sheet from above, but the directions may be opposite. Further, the cutting marks 83 are included in the image to be formed based on the image data, but the cutting marks 83 may not be included. In this case, the image forming apparatus 10 may be configured to add cutting mark information to image data so that the cutting marks 83 are to be formed at cutting positions of a sheet, on which an image is to be formed based on the image data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-209887, filed Nov. 20, 2019, which is hereby incorporated by reference herein in its entirety.

What is claimed is:

1. An image forming apparatus, comprising:
an image forming unit configured to form an image on a sheet;
a conveyance roller configured to convey the sheet along a conveyance path;
a reading unit which is provided on the conveyance path, and is configured to read a pattern formed on the sheet; and
a controller configured to:
control the image forming unit to form a first pattern;
control the conveyance roller to convey a sheet having the first pattern formed thereon;
control the reading unit to read the first pattern;
generate first data based on a result of reading the first pattern;
control the image forming unit to form a user image and a second pattern, the second pattern being formed in a region on the sheet that is different from a region in which the user image is formed;
control the conveyance roller to convey the sheet having the second pattern formed thereon;
control the reading unit to read the second pattern;
generate second data based on a result of reading the second pattern; and
control, based on the first data and the second data, a density of a user image to be formed by the image forming unit,
wherein the controller is configured to generate the first data based on results of reading different positions of the first pattern,
wherein the controller is configured to generate the second data based on results of reading different positions of the second pattern, and
wherein the number of results of reading different positions of the first pattern, which are used to generate the first data, is greater than the number of results of reading different positions of the second pattern, which are used to generate the second data.

2. The image forming apparatus according to claim 1, wherein a length, in a conveying direction of the sheet to be conveyed by the conveyance roller, of the first pattern is longer than a length in the conveying direction of the second pattern.

3. The image forming apparatus according to claim 1,
wherein the controller is configured to generate, in order to control the density of the user image to be formed by the image forming unit, a conversion condition based on the first data and the second data,
wherein the controller is configured to convert image data based on the conversion condition, and
wherein the image forming unit is configured to form the user image based on the converted image data.

4. The image forming apparatus according to claim 1,
wherein the controller is configured to generate, in order to control the density of the user image to be formed by the image forming unit, a tone correction table based on the first data and the second data,
wherein the controller is configured to convert image data based on the tone correction table, and
wherein the image forming unit is configured to form the user image based on the converted image data.

5. An image forming apparatus, comprising:
an image forming unit configured to form an image on a sheet;
a conveyance roller configured to convey the sheet along a conveyance path;
a reading unit which is provided on the conveyance path, and is configured to read a pattern formed on the sheet; and
a controller configured to:
control the image forming unit to form a first pattern on a plurality of sheets;
control the conveyance roller to convey the plurality of sheets;
control the reading unit to read the first pattern;
generate first data based on a result of reading the first pattern;
control the image forming unit to form a user image and a second pattern, the second pattern being formed in a region on the sheet that is different from a region in which the user image is formed;
control the conveyance roller to convey the sheet having the second pattern formed thereon;
control the reading unit to read the second pattern;
generate second data based on a result of reading the second pattern; and
control, based on the first data and the second data, a density of a user image to be formed by the image forming unit.

6. The image forming apparatus according to claim 5,
wherein the controller is configured to generate, in order to control the density of the user image to be formed by the image forming unit, a conversion condition based on the first data and the second data,
wherein the controller is configured to convert image data based on the conversion condition, and
wherein the image forming unit is configured to form the user image based on the converted image data.

7. The image forming apparatus according to claim 5,
wherein the controller is configured to generate, in order to control the density of the user image to be formed by the image forming unit, a tone correction table based on the first data and the second data,
wherein the controller is configured to convert image data based on the tone correction table, and
wherein the image forming unit is configured to form the user image based on the converted image data.

\* \* \* \* \*